United States Patent [19]

Maresca

[11] Patent Number: 5,144,001
[45] Date of Patent: Sep. 1, 1992

[54] AROMATIC AMORPHOUS THERMOPLASTIC POLYMERS

[75] Inventor: Louis M. Maresca, Belle Mead, N.J.

[73] Assignee: Amoco Corporation, Chicago, Ill.

[21] Appl. No.: 468,163

[22] Filed: Jan. 19, 1990

Related U.S. Application Data

[63] Continuation of Ser. No. 233,185, Aug. 17, 1988, abandoned, which is a continuation of Ser. No. 91,439, Aug. 31, 1987, abandoned, which is a continuation of Ser. No. 795,758, Nov. 8, 1985, abandoned, which is a continuation of Ser. No. 451,192, Dec. 20, 1982, abandoned, which is a continuation of Ser. No. 186,466, Sep. 12, 1980, abandoned.

[51] Int. Cl.$^5$ .............. C08G 75/23; C08G 65/40; C08G 8/02; C08G 14/00
[52] U.S. Cl. .............. 528/171; 528/125; 528/126; 528/174; 528/175; 528/219; 525/534; 525/535
[58] Field of Search ............... 528/125, 126, 171, 174, 528/175, 219; 525/534, 535

[56] References Cited

U.S. PATENT DOCUMENTS

| | | | |
|---|---|---|---|
| 4,108,837 | 8/1978 | Johnson et al. | 528/126 |
| 4,175,175 | 11/1979 | Johnson et al. | 528/125 |
| 4,273,903 | 6/1981 | Rose | 528/174 |

FOREIGN PATENT DOCUMENTS

| | | |
|---|---|---|
| 0113112 | 7/1984 | European Pat. Off. |
| 1159924 | 7/1969 | United Kingdom |

Primary Examiner—John Kight, III
Assistant Examiner—P. Hampton-Hightower
Attorney, Agent, or Firm—Janice M. McLain; William H. Magidson; Robert J. Wagner

[57] ABSTRACT

Described herein are amorphous thermoplastic terpolymers containing units of the formula:

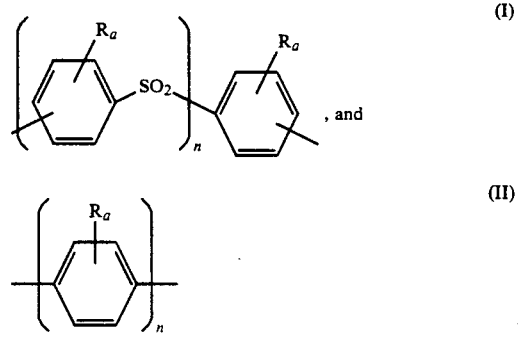

wherein R is independently hydrogen, $C_1$ to $C_6$ alkyl, or $C_4$ to $C_8$ cycloalkyl, a is an integer of 0 to 4 and n is independently an integer of 1 to 3. The units are attached to each other by an —O— bond. These polymers have an excellent combination of mechanical properties. They display high notched izod impact values, high heat distortion temperatures and excellent environmental stress crack resistance.

6 Claims, No Drawings

AROMATIC AMORPHOUS THERMOPLASTIC POLYMERS

This is a continuation of application Ser. No. 233,185, filed Aug. 17, 1988, now abandoned which is a continuation of Ser. No. 091,439 filed Aug. 31, 1987 now abandoned which is a continuation of Ser. No. 795,758, filed Nov. 8, 1985 now abandoned, which is a continuation of Ser. No. 451,192, filed Dec. 20, 1982 now abandoned, which in turn is a continuation of Ser. No. 186,466, filed Sep. 12, 1980 now abandoned.

BACKGROUND OF THE INVENTION

This invention is directed to amorphous thermoplastic polymers containing sulfone groups.

Polyarylene polyethers are described in, for example, U.S. Pat. No. 4,175,175. This patent describes a polymer which has the following structure:

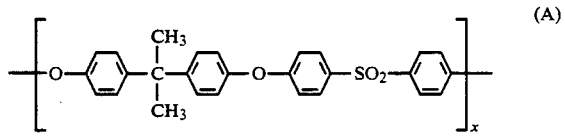
(A)

This polymer is commercially available and is a tough, rigid, high strength thermoplastic which maintains its properties over a wide temperature range from $-150°$ F. to above $300°$ F. Polymer (A) has a good combination of mechanical properties and excellent electrical properties. Said polymer is highly resistant to mineral acids, alkali and salt solutions but will be attached by environments such as polar organic solvents. Thus, there is a need to improve the environmental resistance, particularly the environmental stress crack resistance of Polymer (A) so that it can be used in applications where it will be exposed to a solvent environment.

Attempts have been made to develop polymers which have the good properties of polymer (A) and additionally, improved environmental stress crack resistance.

The following polymer (B):

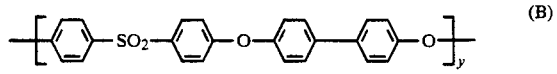
(B)

has a good balance of mechanical properties, and possesses higher notched impact strength and heat deflection temperature than polymer (A). Additionally, polymer (B) has improved stress crack resistance. However, polymer (B) is prepared from 4,4'-dichlorodiphenyl sulfone and 4,4'-biphenol. The 4,4'-biphenol is difficult and costly to prepare and does not readily lend itself to commercialization.

Accordingly, a need still exists for a polymer which has the good combination of mechanical properties of polymer (A) and improved environmental stress crack resistance.

A novel class of amorphous thermoplastic polymers has been discovered which can be easily prepared, are inexpensive and thus lend themselves to commercialization. They possess an excellent combination of mechanical properties. Additionally, these novel polymers display high notched izod impact values, high heat distortion temperatures and have excellent environmental stress crack resistance.

THE INVENTION

This invention is directed to novel amorphous thermoplastic terpolymers.

The terpolymers of this invention contain units of the formula:

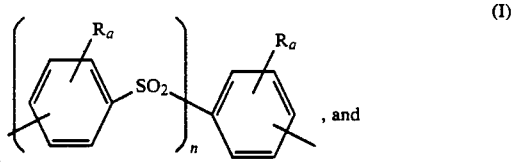
(I)
, and

(II)

wherein R is independently hydrogen, $C_1$ to $C_6$ alkyl, or $C_4$ to $C_8$ cycloalkyl, a is independently an integer of 0 to 4 and n is independently an integer of 1 to 3 and wherein the ration of unit (I) to unit (II) is greater than 1. The units are attached to each other by an —O— bond. The preferred ratio of unit (I) to unit (II) is from about 70:30 to about 85:15.

The preferred terpolymer of this invention contains units of the formula:

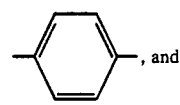
, and

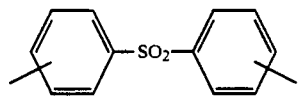

These units are attached to each other by an —O— bond.

The terpolymers may be random or may have an ordered structure.

The terpolymers of this invention have a reduced viscosity of from about 0.4 to greater than about 2.5, as measured in N-methylpyrolidone, or other suitable solvent at 25° C.

The polymers of this invention are prepared by reacting the monomers represented by the following formulae:

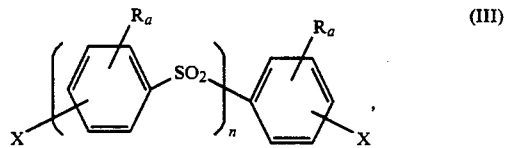
(III)

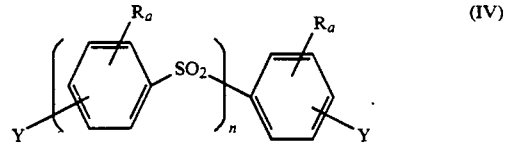
(IV)

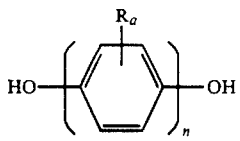

(V)

wherein R, a, and n are as previously defined, and X and Y are independently selected from Cl, Br, F, NO$_2$, or OH and at least 50 percent of the Y's are OH.

The ratio of the concentration of OH groups to Cl, Br, F and/or NO$_2$ groups used to form the polymer is from about 0.90 to about 1.10, preferably from about 0.98 to about 1.02.

The monomers, represented by formulas (III) to V, include the following:
hydroquinone,
4,4'-dihydroxybiphenyl,
2-methylhydroquinone,
4,4'-dihydroxydiphenyl sulfone,
2,4'-dihydroxydiphenyl sulfone,
4,4'-dichlorodiphenyl sulfone,
4,4'-dinitrodiphenyl sulfone,
4-chloro-4'-hydroxydiphenyl sulfone, and the like.

The preferred monomers include hydroquinone, 4,4'-dichlorodiphenyl sulfone and 4,4'-dihydroxydiphenyl sulfone.

The polymers of this invention are prepared by contacting substantially equimolar amounts of the hydroxy containing compounds (depicted in formulas (III) to (IV) supra) and halo and/or nitro containing compounds (depicted in formula (III) and (IV) supra) with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction is kept at from about 120° to about 180° C., for about 1 to about 5 hours and then raised and kept at from about 200° to about 250° C., preferably from about 210° to about 230° C., for about 1 to 10 hours.

The reaction is carried out in an inert atmosphere, e.g., nitrogen, at atmospheric pressure, although higher or lower pressures may also be used.

The polymer is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed are those generally known in the art for the manufacture of polyarylether sulfones and include sulfur containing solvents such as those of the formula:

$$R_1-S(O)_b-R_1$$

in which each $R_1$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents all oxygens and two carbon atoms are bonded to the sulfur atom. Contemplated for use in this invention are such solvents as those having the formula:

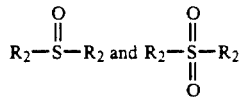

where the $R_2$ groups are independently lower alkyl, such as methyl, ethyl, propyl, butyl, and like groups, and aryl groups such as phenyl and alkylphenyl groups as well as those where the $R_2$ groups are interconnected as in a divalent alkylene bridge such as

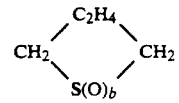

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include dimethyl acetamide, dimethyl formamide and N-methylpyrolidone.

The azeotrope forming solvent and polar aprotic solvent are used in a weight ratio of from about 10:1 to about 1:1, preferably from about 7:1 to about 5:1.

In the reaction, the hydroxy containing compound is slowly converted, in situ, to the alkali salt thereof by reacting with the alkali metal carbonate. The alkali metal carbonate is preferably potassium carbonate. Mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less than 0.5 percent by weight water during the reaction.

Preferably, after the desired molecular weight has been attained, the polymer is treated with an activated aromatic halide or an aliphatic halide such as methyl chloride or benzyl chloride, and the like. Such treatment of the polymer converts the terminal hydroxyl groups into ether groups which stabilize the polymer. The polymer so treated has good melt and oxidative stability.

The terpolymers of this invention may be blended with one or more compatible thermoplastic polymers such as polyarylates, poly(aryl ethers), polyetherimides, polyesters, aromatic polycarbonates including polyestercarbonates, polyurethanes, polyhydroxyethers, and the like.

EXAMPLES

The following examples serve to give specific illustrations of the practice of this invention but they are not intended in any way to limit the scope of this invention. In these examples, all parts and percentages are on a weight basis unless otherwise specified.

The following Examples 1 to 4 describe the preparation of a random terpolymer.

EXAMPLE 1

A four neck 1000 ml round-bottom flask was equipped with a mechanical stirrer, thermometer, addition funnel, dry nitrogen inlet, and vacuum jacketed vigreux column with Dean Stark trap and condenser. Into the flask were charged 143.58 g (0.50 moles) of 4,4'-dichlorodiphenyl sulfone, 62.58 g (0.25 moles) of 4,4'-dihydroxydiphenyl sulfone, 27.56 g (0.25 moles) of hydroquinone, 76.02 g (0.55 moles) of potassium carbonate, 100 ml of toluene and 466 ml of sulfolane. The mixture was purged with nitrogen for 1 hour at room temperature and then heated to reflux (141° C.). After 1 hour at reflux, the temperature of the reaction was increased to about 200° C. by slowly removing the toluene. After about 5 hours at 200° C., the reaction was terminated by adding methyl chloride. The polymer so produced was recovered by coagulation in water followed by washing the polymer several times with hot water (80° C.). A theoretical yield of the polymer was obtained. The polymer had a reduced viscosity of 0.61 dl/g as measured in N-methylpyrolidinone (0.2 g/100 ml) at 25° C. The polymer was made up of the following repeating unit:

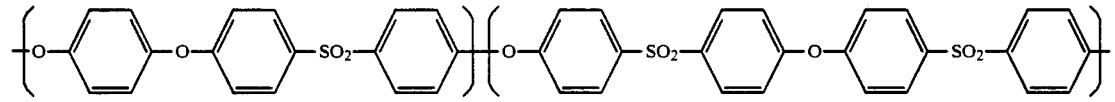

EXAMPLES 2 to 4

The procedure as described in Example 1 was exactly repeated except that the mole ratio of 4,4'-dihydroxydiphenyl sulfone (DHDPS) and hydroquinone (HQ) was varied and is shown in Table I. The reduced viscosity of the polymers formed were measured, as described in Example 1. The results are shown in Table I.

TABLE I

| Example | Mole Ratio of DHDPS/HQ | Reduced Viscosity (dl/g) |
| --- | --- | --- |
| 1 | 50/50 | 0.61 |
| 2 | 25/75 | 0.45 |
| 3 | 50/50 | 0.54 |

TABLE I-continued

| Example | Mole Ratio of DHDPS/HQ | Reduced Viscosity (dl/g) |
| --- | --- | --- |
| 4 | 75/25 | 0.43 |

The polymers prepared in Examples 1 to 4 were compression molded at about 300° C. into ASTM test bars and tested for the following properties: Tensile strength and modulus according to ASTM D-638; yield strength according to ASTM D-790; elongation at break according to ASTM D-638; pendulum impact strength according to ASTM D-1822. The glass transition temperature (Tg) of the polymer was obtained by a dynamic mechanical method using a torsion pendulum as described in L. E. Nielsen, Mechanical Properties of Polymers, Van Nostrand-Reinhold, Princeton, N.J. Also, the reduced viscosity of the polymer is shown.

Controls A and B were also tested as described to determine their physical properties. The reduced viscosity of the Controls was measured in methylene chloride at 25° C. (0.2 gm/100 ml).

Control A is a polymer of the following formula:

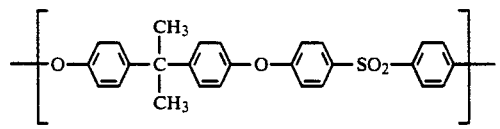

and Control B has the following formula:

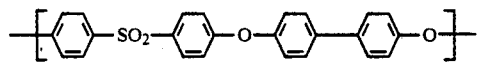

The results are shown in Table II.

Also, the environmental stress rupture resistance of Controls A and B and Example 4 was measured. Samples of the polymers were placed under the stess shown in Table II. A cotton swab saturated with the chemical environment, as identified in Table III, is attached to the center of the test specimen. The time for the specimen to rupture is then recorded. The results are shown in Table III.

TABLE II

| Example | Tensile modulus (psi) | Tensile strength (psi) | Yield strength (psi) | Elongation (%) | Pendulum impact (ft. lbs/in$^3$) | Tg (°C.) | Reduced viscosity (dl/g) |
| --- | --- | --- | --- | --- | --- | --- | --- |
| Control A | 370,000 | 10,000 | 10,000 | 50 | 150 | 185 | 0.50 |
| Control B | 321,000 | 10,600 | 10,600 | 78 | 300 | 215 | 0.55 |
| 1 | 277,000 | 10,600 | 10,600 | 18 | 118 | 200 | 0.61 |
| 2 | 281,000 | 11,400 | 11,400 | 7 | 93 | 180 | 0.45 |
| 3 | 279,000 | 11,000 | 11,000 | 8 | 97 | 205 | 0.54 |
| 4 | 294,000 | 11,800 | 11,800 | 8 | 63 | 210 | 0.43 |

TABLE III
ENVIRONMENTAL STRESS RUPTURE RESISTANCE

| Chemical Environment | Stress (psi) | Control A | Control B | Example 4 |
|---|---|---|---|---|
| | | \multicolumn{3}{c}{Time to rupture (sec)} | | |
| Ethyl Acetate | 200 | Inst. rupt. | | |
| | 1000 | | 1300 | 42 |
| Toluene | 200 | 1 | | |
| | 1000 | | 120 | 756 |
| | 2000 | | 35 | 53 |
| Toluene/Heptane 50/50 | 4000 | 3 | 860 | |
| | 5000 | | 32 | 162 |
| Methylene Chloride | 1000 | | 500 | 216 |
| Trichloroethylene | 1000 | Inst. rupt. | 10 | |
| | 2000 | | 5 | 25 |

What is claimed is:

1. An amorphous thermoplastic terpolymer consisting essentially of the following repeating units which are connected by ether linkages:

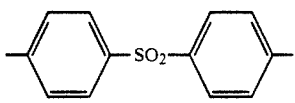

I

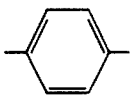

II said terpolymer is produced by the reaction of dichlorodiphenyl sulfone and a mixture of hydroquinone and dihydroxydiphenyl sulfone.

2. A terpolymer as defined in claim 1, wherein the ratio of unit (I) to unit (II) is in the range of from about 70:30 to 85:15.

3. The terpolymer as defined in claim 1 produced by reacting dichlorodiphenyl sulfone with at least a one to one mole ratio of dihydroxydiphenyl sulfone to hydroquinone.

4. The terpolymer as defined in claim 1 produced by reacting dichlorodiphenyl sulfone with at least a one to three mole ratio of dihydroxydiphenyl sulfone to hydroquinone.

5. The terpolymer as defined in claim 1 produced by reacting dichlorophenyl sulfone with at least a three to one mole ratio of dihydroxydiphenyl sulfone to hydroquinone.

6. A terpolymer as defined in claim 1 which is blended with one or more compatible thermoplastic polymers selected from the group consisting of polyarylates, poly(aryl ethers), polyetherimides, polyesters, aromatic polycarbonates, polyurethanes, and polyhydroxyethers.

* * * * *